(12) United States Patent
AlShaikh et al.

(10) Patent No.: US 9,128,211 B2
(45) Date of Patent: *Sep. 8, 2015

(54) HIGH PERFORMANCE AND GRID COMPUTING WITH RELIABILITY QUALITY OF SERVICE CONTROL

(71) Applicants: Saudi Arabian Oil Company, Dhahran (SA); King Fahd University of Petroleum and Minerals, Dhahran (SA)

(72) Inventors: Raed Abdullah AlShaikh, Dhahran (SA); Sadiq M. Sait, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/490,894

(22) Filed: Sep. 19, 2014

(65) Prior Publication Data

US 2015/0006137 A1     Jan. 1, 2015

Related U.S. Application Data

(63) Continuation of application No. 13/649,286, filed on Oct. 11, 2012, now Pat. No. 8,874,804.

(60) Provisional application No. 61/545,766, filed on Oct. 11, 2011.

(51) Int. Cl.
| | |
|---|---|
| *G06F 3/00* | (2006.01) |
| *G06G 7/48* | (2006.01) |
| *G01V 11/00* | (2006.01) |
| *G01V 1/28* | (2006.01) |

(Continued)

(52) U.S. Cl.
CPC ........ *G01V 11/00* (2013.01); *G01V 1/28* (2013.01); *G06F 9/5072* (2013.01); *H04L 67/12* (2013.01); *G01V 2200/14* (2013.01)

(58) Field of Classification Search
CPC ........ G06F 9/5072; G01V 1/28; G01V 11/00; G01V 2200/14; H04L 67/42
See application file for complete search history.

(56) References Cited

U.S. PATENT DOCUMENTS

| | | | |
|---|---|---|---|
| 7,526,418 B2 | 4/2009 | Pita et al. | |
| 7,562,143 B2 * | 7/2009 | Fellenstein et al. | ........... 709/226 |

(Continued)

OTHER PUBLICATIONS

Adnan M. Agbaria et al., "Starfish: Fault-Tolerant Dynamic MPI Programs on Clusters of Workstations (Extended Abstract)", 8th IEEE International Symposium on High Performance Distributed Computing; 1999; pp. 167-176.

(Continued)

*Primary Examiner* — Henry Tsai
*Assistant Examiner* — Jung-Yih Shyu
(74) *Attorney, Agent, or Firm* — Bracewell & Giuliani LLP; Constance G. Rhebergen; Albert B. Kimball, Jr.

(57) ABSTRACT

High performance computing (HPC) and grid computing processing for seismic and reservoir simulation are performed without impacting or losing processing time in case of failures. A Data Distribution Service (DDS) standard is implemented in High Performance Computing (HPC) and grid computing platforms, to avoid the shortcomings of current Message Passing Interface (MPI) communication between computing modules, and provide quality of service (QoS) for such applications. QoS properties of the processing can be controlled.

27 Claims, 5 Drawing Sheets

(51) Int. Cl.
*G06F 9/50* (2006.01)
*H04L 29/08* (2006.01)

(56) References Cited

U.S. PATENT DOCUMENTS

| | | | |
|---|---|---|---|
| 7,596,480 B2 | 9/2009 | Fung et al. | |
| 7,620,534 B2 | 11/2009 | Pita et al. | |
| 7,660,711 B2 | 2/2010 | Pita et al. | |
| 7,809,537 B2 | 10/2010 | Hemanthkumar et al. | |
| 8,577,660 B2 * | 11/2013 | Wendt et al. | 703/10 |
| 2004/0162677 A1 * | 8/2004 | Bednar et al. | 702/14 |
| 2006/0248182 A1 * | 11/2006 | Glassco et al. | 709/223 |
| 2007/0118842 A1 * | 5/2007 | Weida | 719/330 |
| 2009/0187391 A1 * | 7/2009 | Wendt et al. | 703/7 |
| 2010/0114494 A1 | 5/2010 | Higginbotham et al. | |
| 2010/0254217 A1 * | 10/2010 | Chu et al. | 367/38 |
| 2011/0138396 A1 * | 6/2011 | Chen et al. | 718/105 |
| 2011/0153300 A1 * | 6/2011 | Holl et al. | 703/10 |
| 2011/0295923 A1 * | 12/2011 | de Campos Ruiz et al. | 709/201 |
| 2012/0136996 A1 * | 5/2012 | Seo et al. | 709/224 |

OTHER PUBLICATIONS

Anonymous "OpenDDS Developer's Guide" OpenDDS Version 3.0; Aug. 19, 2011; 192 pages.

Angelo Corsaro et al, "Quality of Service in Publish/Subscribe Middleware", Global Data Management vol. 19 No. 20; Apr. 26, 2006; pp. 1-22.

International Search Report with Written Opinion issued in related PCT Application No. PCT/US2012/059630; dated Sep. 12, 2013; 13 pages.

Jothi P. Neelamegam et al., "PromisQoS: An Architecture for Delivering QoS to High-Performance Applications on Myrinet Clusters", Proceedings of the 28th Annual International Conference on Local Computer Networks; Oct. 2003; 8 pages.

Stamatia Rizou et al., "Providing QoS Guarantees in Large-Scale Operator Networks", International Conference on High Performance Computing and Communications; 2010; pp. 1-9.

Stan Schneider et al.. "Is DDS for You? A Whitepaper by Real-Time Innovations" Real-Time Innovations, Inc.; Apr. 29, 2009; 12 pages.

* cited by examiner

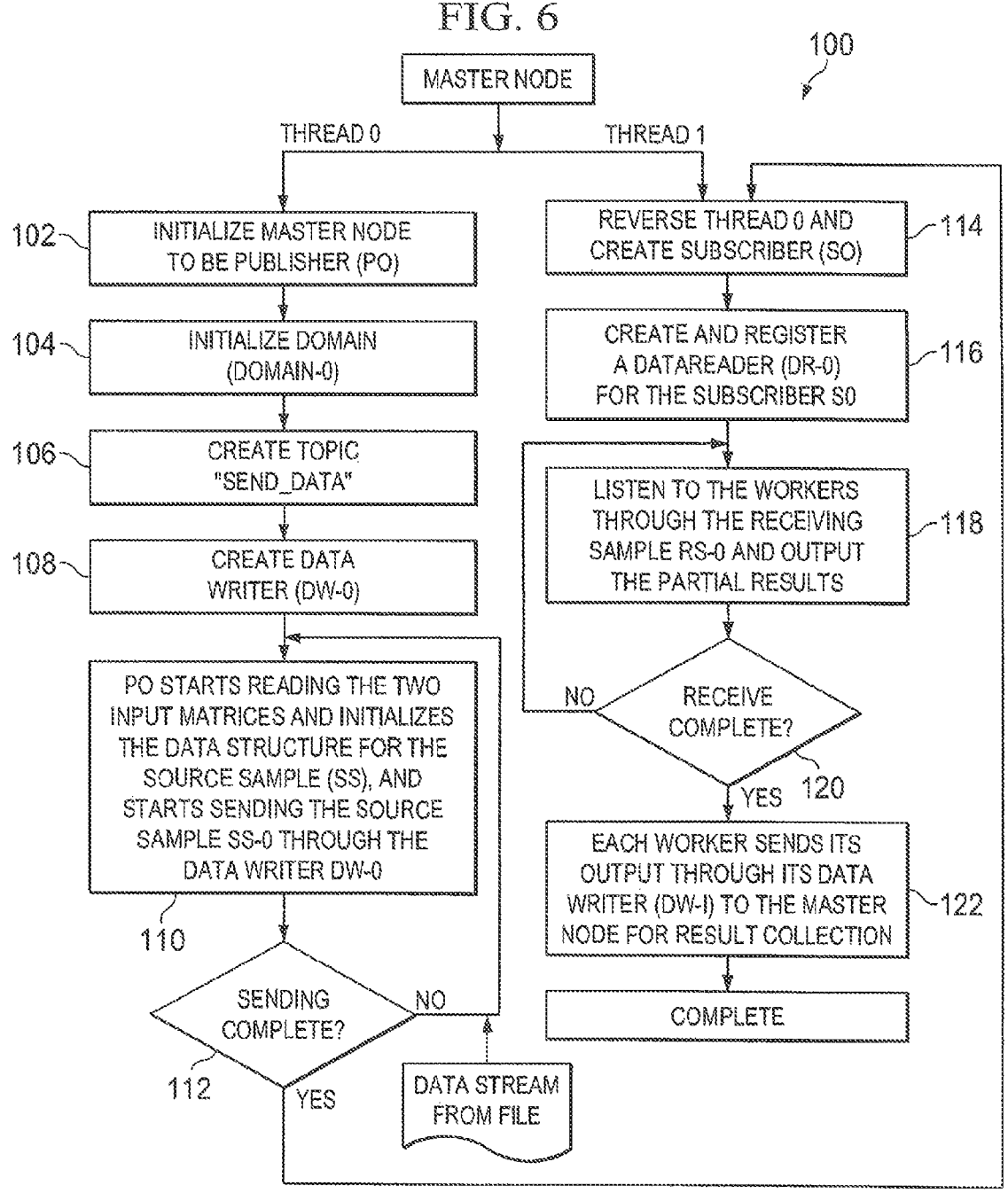

HIGH PERFORMANCE AND GRID COMPUTING WITH RELIABILITY QUALITY OF SERVICE CONTROL

CROSS REFERENCED TO RELATED APPLICATIONS

This application is a continuation of and claims priority to, commonly-owned U.S. patent application Ser. No. 13/649,286, filed Oct. 11, 2012, titled, "High Performance and Grid Computing With Quality of Service Control" and issued as U.S. Pat. No. 8,874,804 which claims priority to U.S. Provisional Patent Application No. 61/545,766 filed Oct. 11, 2011.

BACKGROUND OF THE INVENTION

1. Field of the Invention

The present invention relates to high performance and grid computing of data for exploration and production of hydrocarbons, such as computerized simulation of hydrocarbon reservoirs in the earth, geological modeling, and processing of seismic survey data, and in particular to quality of service (QoS) control of such computing.

2. Description of the Related Art

In the oil and gas industries, massive amounts of data are required to be processed for computerized simulation, modeling and analysis for exploration and production purposes. For example, the development of underground hydrocarbon reservoirs typically includes development and analysis of computer simulation models of the reservoir. These underground hydrocarbon reservoirs are typically complex rock formations which contain both a petroleum fluid mixture and water. The reservoir fluid content usually exists in two or more fluid phases. The petroleum mixture in reservoir fluids is produced by wells drilled into and completed in these rock formations.

A geologically realistic model of the reservoir, and the presence of its fluids, also helps in forecasting the optimal future oil and gas recovery from hydrocarbon reservoirs. Oil and gas companies have come to depend on geological models as an important tool to enhance the ability to exploit a petroleum reserve. Geological models of reservoirs and oil/gas fields have become increasingly large and complex.

In simulation and geological models, the reservoir is organized into a number of individual cells. Seismic data with increasing accuracy has permitted the cells to be on the order of 25 meters areal (x and y axis) intervals. For what are known as giant reservoirs, the number of cells is the least hundreds of millions, and reservoirs of what is known as giga-cell size (a billion cells or more) are encountered.

Similar considerations of data volume are also presented in seismic data processing. Seismic data obtained from surveys over large areas of the earth's surface such as above giant reservoirs, has been acquired and made available in increased volumes. In processing vast amounts of data of all three of the types described above, processing time was an important consideration.

Three types of computer systems have been available for processing the vast amounts of data of the types encountered in petroleum exploration and production. These are supercomputers, high performance computing (HPC) and grid computing. Typically, supercomputers are specially designed for particular calculation intensive tasks. An HPC system takes the form of a group of powerful workstations or servers, joined together as a network to function as one supercomputer. Grid computing involves a more loosely coupled, heterogeneous and often dispersed network of workstations or servers than HPC.

So far as is known, existing distributed memory HPC and grid computing systems did not provide proper quality of service (QoS) based communication because of two limitations. First, standard communication libraries such as Message Passing Interface (MPI) and Parallel Virtual Machine (PVM) did not provide a capability for applications to specify service quality for computation and communication. Second, modern high-speed interconnects such as Infiniband, Myrinet, Quadrics and Gigabit Ethernet were optimized for performance rather than for predictability of communication latency and bandwidth.

There has been, so far as is known, little attention given to QoS control in high performance and grid computing. HPC users have witnessed a dramatic increase in performance over the last ten years with regard to the HPC systems. What used to take one month of HPC computation time in the ten years ago, is now taking only a few hours to run in current systems.

In view of this, the simplest remedy to users for a data accuracy failure rate during a routine computation run has been resubmitting the processing data run after disregarding or offlining (or what is known as fencing) the problematic node/core. However, the hours of the crashed job were thus discarded and wasted. Moreover, in the case of a more extensive data processing run which would require several days or even weeks to perform, resubmitting the entire data set for processing was required. This was duplicative and time consuming.

U.S. Pat. No. 7,526,418, which is owned by the assignee of the present application, relates to a simulator for giant hydrocarbon reservoirs composed of a massive number of cells. The simulator mainly used high performance computers (HPC). Communication between the cluster computers was performed according to conventional, standard methods, such as MPI mentioned above and Open MP.

U.S. Published Patent Application No. 2011/0138396 related to a data distribution mechanism in HPC clusters. The focus of the system described was methodology to enable data to be distributed rapidly to various computation nodes in an HPC cluster. Thus, the focus and teachings of this system were improving processing speed by more rapidly distributing data to the cluster nodes.

SUMMARY OF THE INVENTION

Briefly, the present invention provides a new and improved computer implemented method of computerized processing in a data processing system of data for exploration and production of hydrocarbons. The data processing system includes at least one master node established as a publisher of data with an established quality of service standard profile, a plurality of processor nodes established as subscribers to receive data from the publisher master node, and a data memory. According to the method of the present invention, the data is transmitted from the publisher master node to the subscriber processor nodes as topics for processing by subscriber processor nodes. The established quality of service standard profile is also transmitted from the publisher master node to the subscriber processor nodes. The transmitted data is processed in the subscriber processor nodes, and a determination is made regarding whether the processed data at the subscriber processor nodes complies with the transmitted established quality of service standard profile from the publisher master node. If the processed data so complies, the processed data which complies is transmitted from the subscriber processor nodes to the publisher master node. If the processed data does not comply, transfer of the processed data which does not comply with the transmitted established quality of service standard profile is inhibited. The processed data transmitted from the subscriber processor nodes is assembled in the data memory of the data processing system.

The present invention also provides a new and improved data processing system for computerized processing of data for exploration and production of hydrocarbons. The data processing system includes a master node established as a publisher of data with an established quality of service standard profile which transmits the data from the publisher master node as topics for processing, and also transmits the established quality of service standard profile from the publisher master node. The data processing system also includes a plurality of processor nodes established as subscribers to receive data from the publisher master node. The subscriber nodes receive the data topics and the established quality of service standard profile from the publisher master node. The subscriber processor nodes process the transmitted data topics from the publisher master node and determine whether the processed data complies with the transmitted established quality of service standard profile from the publisher master node. If the processed data so complies, the processed data in compliance with the transmitted established quality of service standard profile is transmitted from the subscriber processor nodes to the publisher master node. Transfer of the processed data which does not comply with the transmitted established quality of service standard profile is inhibited. The master node assembles in the data memory the processed data which complies with the transmitted established quality of service standard profile.

The present invention further provides a new and improved data storage device having stored in a computer readable medium computer operable instructions for causing a data processing system to perform computerized processing of data for exploration and production of hydrocarbons. The data processing system includes: at least one master node established as a publisher of data with an established quality of service standard profile, a plurality of processor nodes established as subscribers to receive data from the publisher master node, and a data memory. The instructions stored in the data storage device causing the data processing system to transmit from the publisher master node to the subscriber processor nodes the data as topics for processing by subscriber processor nodes, and also transmit the established quality of service standard profile from the publisher master node to the subscriber processor nodes. The instructions also cause the processor subscriber nodes to process the transmitted data, and determine whether the processed data at the subscriber processor nodes complies with the transmitted established quality of service standard profile from the publisher master node. The instructions also cause the processor subscriber nodes to transmit the processed data which complies with the transmitted established quality of service standard profile from the subscriber processor nodes to the publisher master node, and to inhibit transfer of the processed data which does not comply with the transmitted established quality of service standard profile. The instructions also cause the master publisher node to assemble in the data memory of the data processing system the processed data transmitted from the subscriber processor nodes.

BRIEF DESCRIPTION OF THE DRAWINGS

FIG. 6 is a functional block diagram indicating the interactive operation of processors of the data processing system of FIGS. 2 and 3 during performance of the data processing steps of FIGS. 4 and 5.

DETAILED DESCRIPTION OF THE PREFERRED EMBODIMENTS

The present invention relates to high performance and grid computing of data for exploration and production of hydrocarbons, such as computerized simulation of hydrocarbon reservoirs in the earth, geological modeling, processing of seismic survey data, and other types of data gathered and processed to aid in the exploration and production of hydrocarbons. For the purposes of the present invention data of the foregoing types are referred to herein as exploration and production data. The present invention is particularly adapted for processing exploration and production data where vast amounts of such data are present, such as in or around what are known as giant reservoirs.

Figure 1:
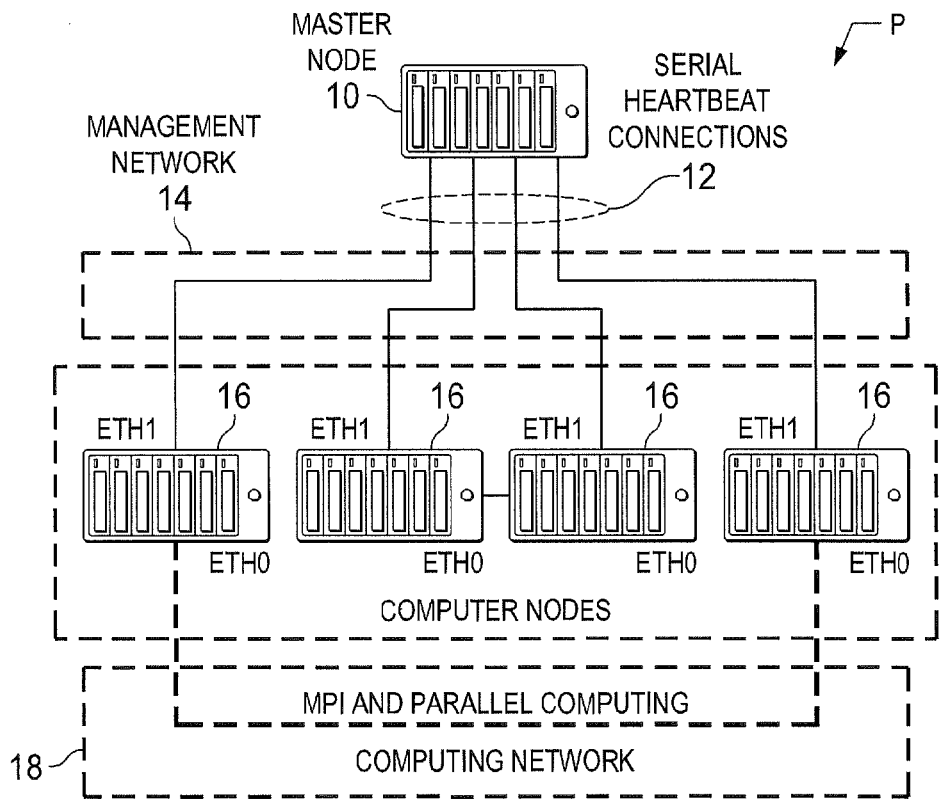
FIG. 1 is a schematic block diagram of a prior art data processing system for high performance computing.

In the drawings, FIG. 1 represents an example prior art high performance computing network P. The high performance computing network P is configured for parallel computing using the message passing interface (MPI) with a master node 10 transferring data through what are known as serial heartbeat connections over data links 12 of a management network 14 to a number of processor nodes 16. The processor nodes 16 are configured to communicate with each other as indicated at 18 according to the message passing interface (MPI) standard communication library during parallel computing and processing of data. As has been set forth, so far as is known, standard communication libraries such as Message Passing Interface (MPI) and Parallel Virtual Machine (PVM) did not provide a capability for applications to specify service quality for computation and communication.

Figure 2:
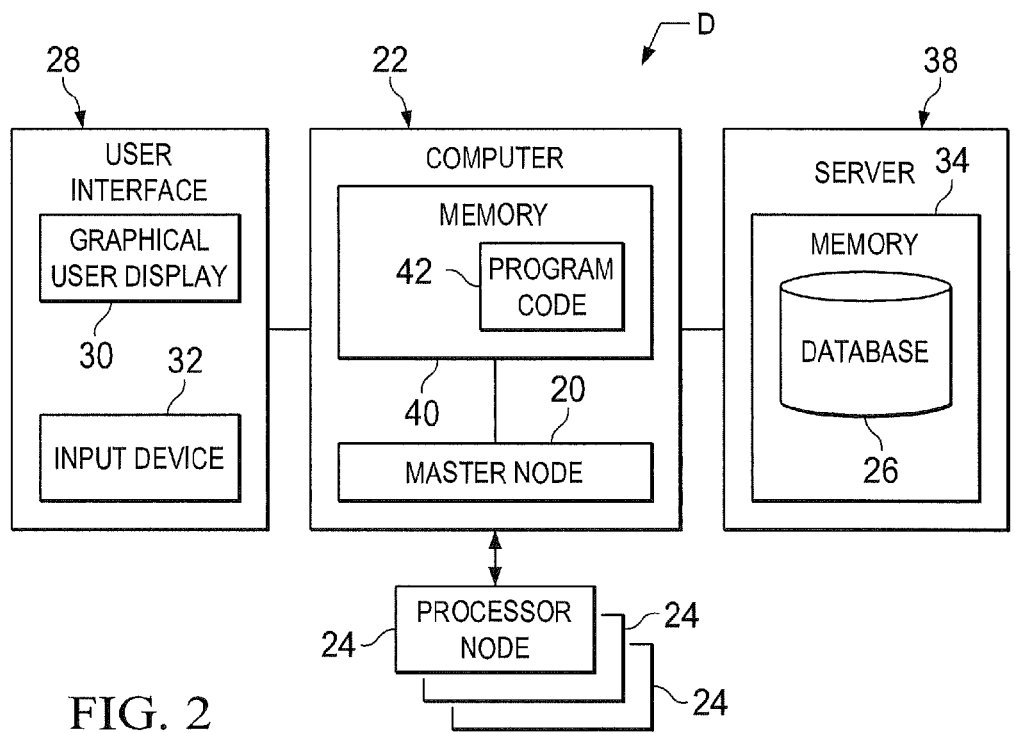
FIG. 2 is a schematic block diagram of a data processing system for high performance and grid computing with quality of service control according to the present invention.

With the present invention, as is shown schematically in FIG. 2 in a data processing system D a master node 20 of a CPU 22 and a group of processor or worker nodes 24 operating as a network arranged for high performance or grid computing, depending on the configuration of the network, of exploration and production data. As will be set forth, the data processing system D processes exploration and production data with a controllable specified quality of service (QoS) for the processing applications. Data processing system D operates according to the processing techniques which are shown schematically in FIGS. 4, 5 and 6. Thus, high performance computing (HPC) and grid computing processing of exploration and production data are performed without impacting or losing processing time in case of failures. A data distribution service (DDS) standard is implemented in the high performance computing (HPC) and grid computing platforms of the data processing system D, to avoid shortcomings of message passing interface (MPI) communication between computing modules, and provide quality of service (QoS) for such applications.

Considering now the data processing system according to the present invention, as illustrated in FIG. 2, the data processing system D is provided as a processing platform for high performance computing (HPC) and grid computing of exploration and processing data. The data processing system D includes one or more central processing units or CPU's 22. The CPU or CPU's 22 have associated therewith a reservoir memory or database 26 for general input parameters, of a type and nature according to the exploration and production data being processed, whether reservoir simulation, geological modeling, seismic data or the like.

A user interface 28 operably connected with the CPU 22 includes a graphical display 30 for displaying graphical images, a printer or other suitable image forming mechanism and a user input device 32 to provide a user access to manipulate, access and provide output forms of processing results, database records and other information.

The reservoir memory or database 26 is typically in a memory 34 of an external data storage server or computer 38. The reservoir database 26 contains data including the structure, location and organization of the cells in the reservoir model, data general input parameters, as well as the exploration and production data to be processed, as will be described below.

The CPU or computer 22 of data processing system D includes the master node 20 and an internal memory 40 coupled to the master node 20 to store operating instructions, control information and to serve as storage or transfer buffers as required. The data processing system D includes program code 42 stored in memory 40. The program code 42, according to the present invention, is in the form of computer operable instructions causing the master node 20 and processor nodes 24 to transfer the exploration and production data and control instructions back and forth according to data distribution service (DDS) intercommunication techniques, as will be set forth.

It should be noted that program code 42 may be in the form of microcode, programs, routines, or symbolic computer operable languages that provide a specific set of ordered operations that control the functioning of the data processing system D and direct its operation. The instructions of program code 42 may be stored in memory 40 or on computer diskette, magnetic tape, conventional hard disk drive, electronic read-only memory, optical storage device, or other appropriate data storage device having a computer usable medium stored thereon. Program code 42 may also be contained on a data storage device as a computer readable medium.

The processor nodes 24 are general purpose, programmable data processing units programmed to perform the processing of exploration and production data according to the present invention. The processor nodes 24 operate under control of the master node 20 and the processing results obtained are then assembled in memory 34 where the data are provided for formation with user interface 28 of output displays to form data records for analysis and interpretation.

Although the present invention is independent of the specific computer hardware used, an example embodiment of the present invention is preferably based on a master node 20 and processor nodes 24 of an HP Linux cluster computer. It should be understood, however, that other computer hardware may also be used.

Figure 3:
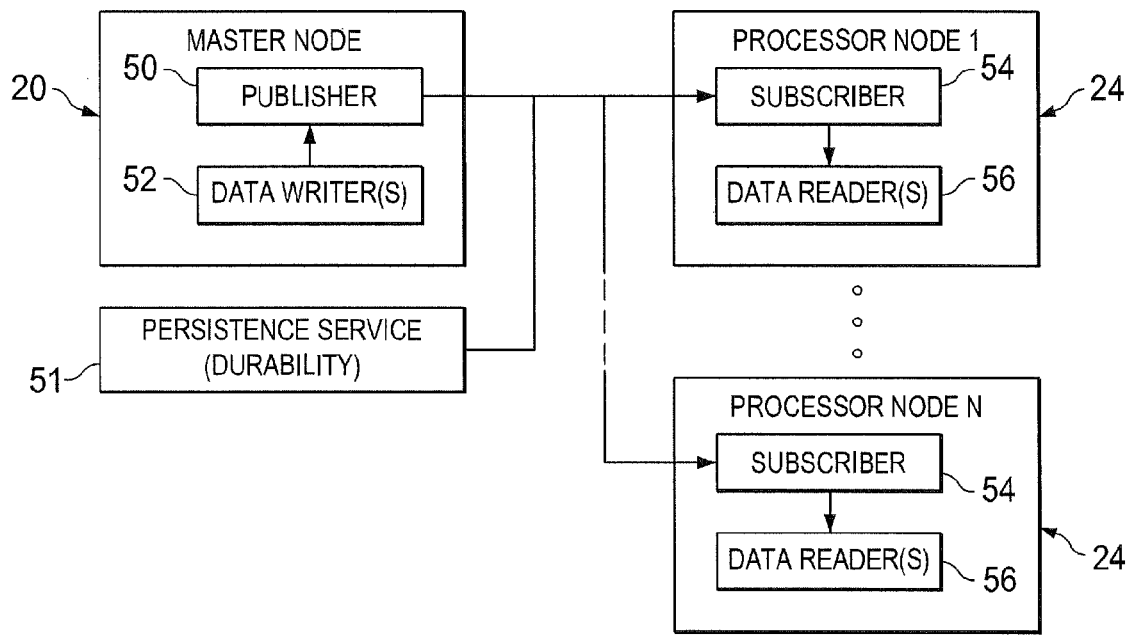
FIG. 3 is a functional block diagram of the data processing system of FIG. 2 configured for high performance processing with quality of service control according to the present invention.

According to the present invention, the data processing system D whose components are shown in FIG. 2 is configured as shown in FIG. 3 according to the data distribution service (DDS) techniques. As indicated in FIG. 3, the master node 20 also shown in FIG. 2 is established as a publisher as indicated at 50 in that the master node 20 is the node responsible for dissemination and distribution of the exploration and production data to be processed by the processor nodes 24. The master node 20 includes a persistence service capability as shown at 51 to preserve data samples so that they can be furnished to processor nodes which replace failed processor nodes, as will be described. The master node 20 is also as indicated at 52 in FIG. 3 established as a data writer for the exploration and production data distributed for processing, so that values of the data which is distributed can be established.

The processor nodes 24 in operating according to data distribution service (DDS) are each individually established as subscribers, as indicated at 54 in FIG. 3. Thus the processor nodes as subscribers are configured to operate as the processors responsible assigned to receive the exploration and production data received as a result of the subscriber relationship to the publisher 50 of the master node 20. The processor nodes 24 are also configured as data readers as indicated at 56 in FIG. 3. As data readers 56, the processor nodes 24 receive an allocated portion of the exploration and production data from the data writer 52 of the master node 20.

The DDS techniques of the present invention are further explained in the data distribution service (DDS) standard. The DDS standard provides a scalable, platform-independent, and location-independent middleware infrastructure to connect information producers to consumers (i.e. nodes to nodes). DDS also supports many quality-of-service (QoS) policies, such as asynchronous, loosely-coupled, time-sensitive and reliable data distribution at multiple layers (e.g., middleware, operating system, and network).

The DDS methodology implements a publish/subscribe (PS) model for sending and receiving data, events, and commands among the participant master node 20 and processor nodes 24 in the processing of exploration and production data according to the present invention. As will be set forth, the master node 20 serves as a primary publisher and the processor nodes 24 function as the primary subscribers. The processor nodes 24 are also configured to transfer the processed exploration and production data results to the master node 20, and the master node 20 is configured for this purpose as a subscriber function. Thus each node of the data processing system D can serve as a publisher, subscriber, or both simultaneously.

Nodes of the data processing system D that are producing information (publishers) create "topics" which are parameters of interest for the data being processed, depending on the type of exploration and production data being processed. The nodes operating in the DDS mode take care of delivering the data samples to those subscribers that indicate an interest in that topic. In a preferred computer network according to the present invention, example implementations of DDS provide low latency messaging (as fast as 65 microseconds between nodes) and high throughput (up to 950 Mbps).

As has been set forth, the present invention processes exploration and production data for giant reservoirs where vast amounts of data need to be processed. An example type of processing performed is two-way data streaming between master and processor nodes. Examples of data streaming usage in exploration and production data for giant reservoirs are U.S. Pat. Nos. 7,596,480; 7,620,534; 7,660,711; 7,526,418; and 7,809,537. It should be understood that the present invention may also be used in connection with communication between nodes for HPC or grid computing of exploration and production data for other types of processing in addition to data streaming. The data communication according to the present invention between nodes for HPC and grid computing may also be used for other types of data, such as bioinformatics processing and computational fluid dynamics. The present invention is adapted for use in processing of large amounts of data which consume considerable time and thus has an increased likelihood of system failure during the course of processing.

Figure 4:
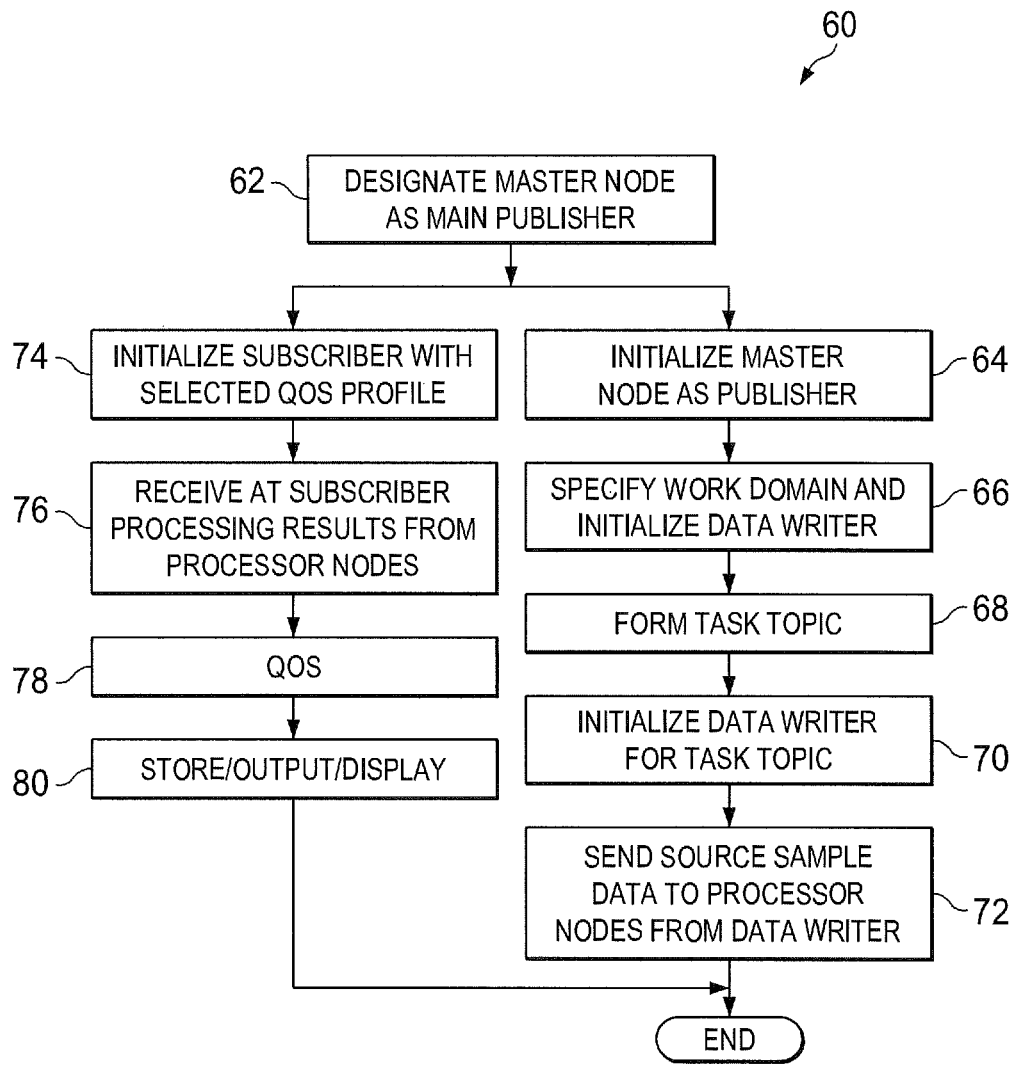
FIG. 4 is a functional block diagram of a set of data processing steps performed in the data processing system of FIGS. 2 and 3 for high performance processing with quality of service control according to the present invention.

FIG. 4 is a functional block diagram of a set 60 of data processing steps performed by the master node 20 in the data processing system D according to the present invention. As shown at step 62 of FIG. 4, the master node 20 is designated as the master publisher. Master node 20 then spawns two threads using OpenMP to parallelize two functionalities. In the first thread, the master node 20 initializes during step 64 to be a publisher (P0) with selected QoS profile, which is predefined in an XML file. For example, in the data streaming embodiment described below, three main QoS policies are adopted. These are: durability, reliability, and history.

The "durability" of the QoS profile saves the published data topics so that the data topics can be delivered to subscribing nodes that join the system at a later time, even if the publishing node has already terminated. The persistence service can use a file system or a relational data base to save the status of the system.

The second QoS profile or policy, which is reliability, indicates the level of reliability requested by a DataReader or offered by a DataWriter. Publisher nodes may offer levels of reliability, parameterized by the number of past issues they can store for the purpose of retrying transmissions. Subscriber nodes may then request different levels of reliable delivery, ranging from fast-but-unreliable "best effort" to highly reliable in-order delivery. Thus providing per-datastream reliability control. In case the reliability type is set to "RELIABLE", the write operation on the DataWriter may be blocked if the modification would cause data to be lost or else cause one of the resource limited to be exceeded.

The third policy, history, controls the behavior of the communication when the value of a topic changes before it is finally communicated to some of its existing DataReader entities. If the type is set to "KEEP_LAST", then the service will only attempt to keep the latest values of the topic and discard the older ones. In this case, a specified value of depth of data retention regulates the maximum number of values the service will maintain and deliver. The default (and most common setting) for depth is one, indicating that only the most recent value should be delivered.

If the history type is set to "KEEP_ALL", then the service will attempt to maintain and deliver all the values of the sent data to existing subscribers. The resources that the service can use to keep this history are limited by the settings of the RESOURCE_LIMITS QoS. If the limit is reached, then the behavior of the service will depend on the RELIABILITY QoS. If the reliability kind is "BEST_EFFORT", then the old values will be discarded. If the reliability setting is "RELIABLE", then the service will block the DataWriter until it can deliver the necessary old values to all subscribers.

In the data streaming embodiment described herein, "DURABILITY" was used and specified, because it was desirable for compute nodes to continue joining the system whenever there is a failure in another node, and thus avoid the consequences of a node failure during an extended processing run. In the third policy of history, "KEEP_LAST" was selected since the streamed seismic or simulation data are not expected to change. Specifically, the seismic shots and simulation cell values are fixed and not dynamic. In reliability QoS policy, RELIABLE, was specified as all the values need to reach the subscribers and have complete answers of the data streaming. The requirement of data accuracy prohibited missing or losing elements while transmitting.

As indicated at step 66, the thread also specifies the domain where all the publishers and subscribers would work on, which is domain-0 in the present embodiment. Next, as indicated at step 68, a topic with an identifying name is specified and a DataWriter (DW-0) is initialized during step 70 under P0 using that topic. After that, the master node 20 as publisher begins reading the data matrices from input to be processed, and initializes the data structure for the source sample (SS) by defining the matrices dimension and the number of processor nodes 24 which are designated as processor or worker nodes for the processing of the exploration and production data. The master node then during step 72 starts sending the Source sample SS-0 to the designated worker processor nodes 24 through the DataWriter DW-0.

The second thread of master node 20 reverses the function of thread 0 by creating an instance of a subscriber S0 as indicated at step 74 with the selected QoS profile in Domain-0, in preparation to receive the partial results from the worker nodes 24 (designated worker nodes 24 act as subscribers at the beginning and then as publishers at the end of their processing). The master node 20 then listens to the worker nodes 24 to receive processing results as indicated at 76 through the receiving sample RS-0 and verifies compliance with the selected QoS profile as indicated at step 78. The master node 20 checks the QoS profile while it is receiving data from the worker nodes. It only receives data from those working nodes 24 which are matching in their QoS. It will not receive and will not negotiate with other worker nodes which have incompatible QoS settings. The master node 20 then during step 80 stores the verified processing results in data memory, and the stored results are available for output and display.

Figure 5:
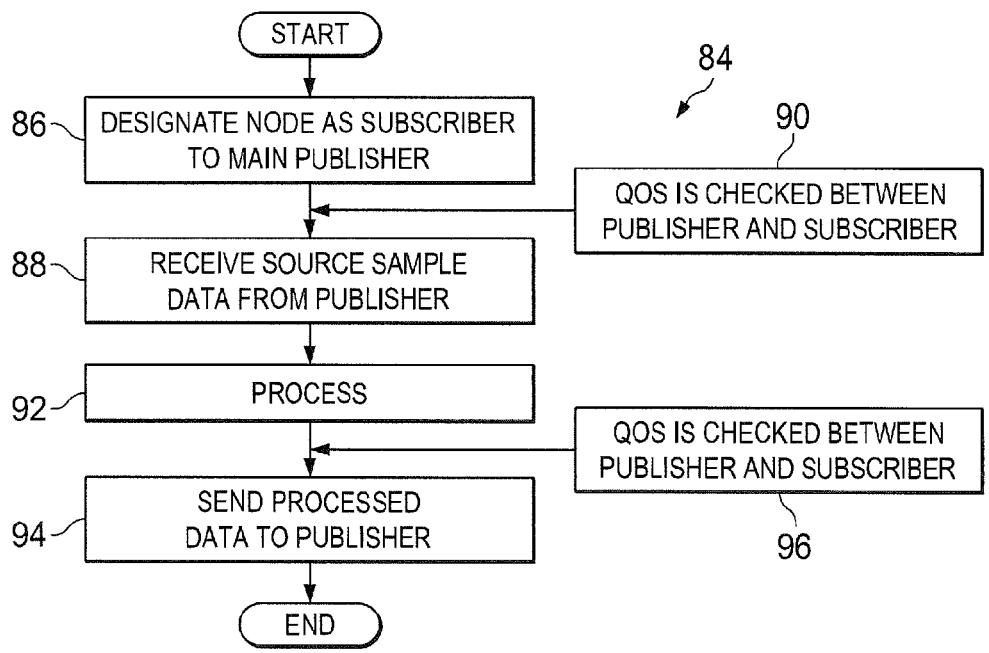
FIG. 5 is a functional block diagram of a set of data processing steps performed in the data processing system of FIGS. 2 and 3 for high performance processing with quality of service control according to the present invention.

FIG. 5 is a functional block diagram of a set 84 of data processing steps performed by the processor nodes 24 in the data processing system D according to the present invention. On the subscribers' side (i.e., the workers), each node 24 during step 86 initiates itself as a subscriber to the main publisher P0, assigns an ID to itself (Wi), and during step 88 starts receiving the data for computational processing. The distribution of which data goes to which node 24 is done dynamically in a way that is determined by first identifying the data range taken by each node according to the format of the data. As indicated at step 90, the QoS checking is done during the nodes' receiving process. The data is then processed during step 92 according to the processing required. Each worker node 24 during step 94 then sends its output with verified QoS through its DataWriter (DW-i) to the master node 20 for result collection. As indicated at step 96, QoS checking is done during the sending of data in step 94. Thus, when there is communication between the publisher and subscriber, QoS checking is done to establish this connection.

FIG. 6 is a diagram 100 illustrating the interaction of the master node 20 and worker processor nodes 24 in an example implementation of a data streaming processing of exploration and production data. The implementation starts at step 102 by designating the master node 20 of the cluster as the main publisher. The master node 20, in turn, spawns two threads using OpenMP to parallelize its two main functions: initializing the node to be a publisher (P0) with the selected QoS profile; and specifying during step 104 the domain which the publishers and subscribers are to work on, which is domain-0 in the example implementation. Specifying the domain is necessary in order to allow multiple groups of publishers and subscribers to work independently, segmenting the cluster into several smaller sub-clusters, if needed. Different algorithms may require different topics (i.e. datasets) to be sent independently by the same publisher, and each of these topics may have several DataWriters for redundancy.

Next, during step 106, a topic with the name "SEND_DATA" is created and a DataWriter (DW-0) is initialized during step 108 under P0 using the created topic. The reason for this hierarchy is that different topics (i.e. datasets) may be required to be sent independently by the same publisher, and each of these topics may have several DataWriters for redundancy. After that, the publisher during step 110 starts reading the seismic shots or simulation cells data from input, and initializes the data structure for the source sample (SS) by defining the matrices data size and the number of workers. The publisher then during step 110 starts sending the source sample SS-0 through the DataWriter DW-0. The procedure continues until step 112 indicates all sending has been completed. Processing then is continued at step 114.

As indicated at step 114, the second thread from master node 20 reverses the function of thread 0 by creating an instance of a subscriber S0 with selected QoS profile in Domain-0, in preparation to receive the partial results from the worker or processor nodes 24. Specifically, a DataReader (DR-0) is configured during step 116 at master node 20 for the subscriber S0 (the workers) that uses topic "RECV_RESULT". Master node 20 then as indicated at step 118 listens to the workers through the receiving sample RS-0 and outputs the partial results. This processing continues as indicated at step 120 until receiving of sample RS-0 is completed.

On the subscribers' side (i.e., the workers), during step 122 each worker node 24 as discussed above and as shown in FIG. 5 initiates itself as a subscriber to the main publisher P0, assigns an ID to itself (Wi), and starts receiving the seismic or simulation data for processing and subsequent result collection. The distribution of which data goes to which node is done dynamically in a way that is determined by first identifying the data size taken by each node according to the format of the data.

In case of a node failure of a processor node 24 on the workers' side, the system administrator of master node 20 may initiate a new processor node 24 with the same ID of the failed worker. The new worker would read the written checkpointed status as defined in the policy, re-read the sample from the persistence service 51, and resume the operation of the system.

It is important to mention that as a requirement for the durability QoS, all sent topics require DataWriters to match the configuration of the persistent QoS policy configuration with the DataReaders. As a consequence, a DataWriter that has an incompatible QoS with respect to what the topic specified will not send its data to the persistent service, and thus its status will not be saved. Similarly, a DataReader that has an incompatible QoS with respect to the specified in the topic will not get data from it.

Thus FIG. 6 illustrates an example parallel processing often encountered with exploration and production data according to the present invention. The results were as expected: QoS could be controlled with fault-tolerance enabled when using the DDS techniques as adopted middleware in such computer processing of exploration and production data. Specifically, compute nodes on the cluster were turned off and back on again, and the jobs continued to run with no need for a restart.

The present invention provides the ability to control QoS properties on HPC and Grids that affect predictability, overhead, resource utilization, and aligns the scarce resources to the most critical requirements to these jobs.

To evaluate the performance of the present invention over conventional HPC and compare it with processing using MPI, data streaming was performed on the same data set using both paradigms (i.e., DDS with the present invention and MPI) and evaluated them on the data processing system clusters of FIGS. 1 and 2. The data streaming processing algorithm is computationally intensive with iterations, and it was chosen since it is a fundamental operation in many numerical linear algebra applications used in processing of exploration and production data. An efficient implementation on parallel computers is an issue of prime importance when providing such systems for processing of exploration and production data.

Figure 7:
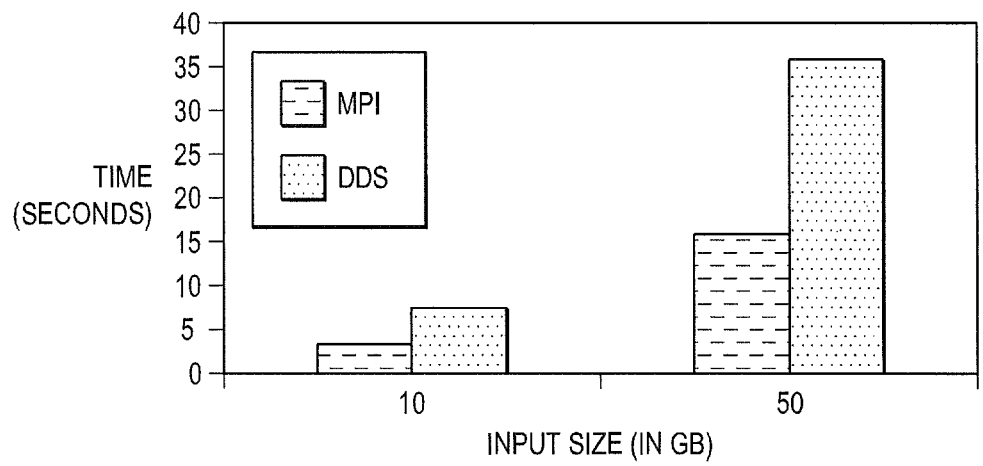
FIG. 7 is a plot of runtime for the data processing system shown in FIGS. 2 and 3 for high performance processing with quality of service control with different sizes of input data in comparison with prior art MPI communication protocols.

FIG. 7 shows benchmarks to test the scalability and runtime of MPI and DDS by streamlining Reservoir Simulation data. It can be seen that the MPI version outperformed in terms of speed by taking around 6.76 seconds to stream 10 GB size of file, compared with 7.9 seconds using DDS. This is expected since the QoS is adding more computations and checks to the communication level. As has been mentioned, however, MPI and PVM are focused on processing speed, with no effort to monitor accuracy or possible processing deficiencies.

Figure 8:
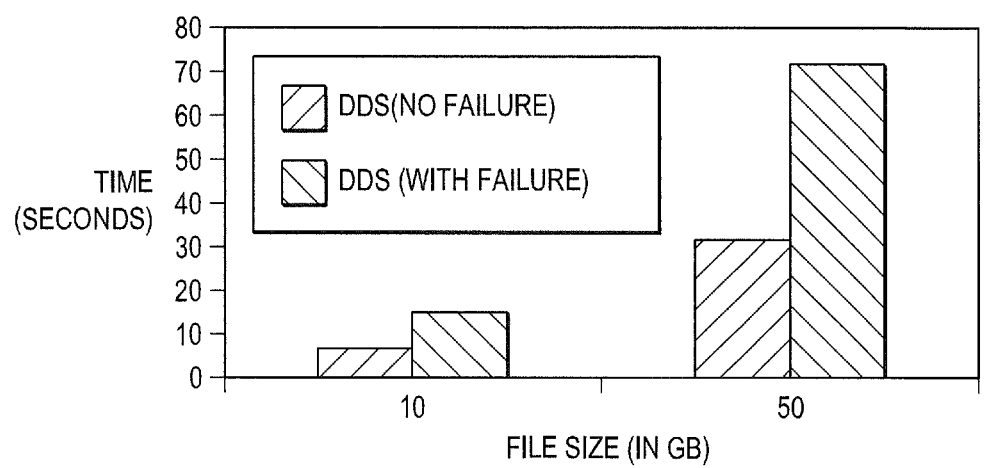
FIG. 8 is a plot of network time delay in engaging a new processor node for different file sizes in the data processing system of FIGS. 2 and 3.

FIG. 8 shows the delay in engaging a new node according to the present invention, replacing a crashed node, while using the persistent service and durability, reliability and history QoS. This test is not applicable to a prior art MPI implementation. Since MPI implementations do not provide a capability of specifying service quality for computation or communication. As indicated in FIG. 8, the delay in engaging a new node is proportional to the size of the matrices, since the persistent service needs to resend all the previously published instances to this new node. During the benchmark testing, test results depicted in FIG. 8 indicate that it took 15.2 seconds in a 10 GB data stream between nodes, while it took 72.2 seconds in a 50 GB test. This is to be compared with the time required when it was necessary to resubmit the entire data set for processing for data in large quantities.

The present invention thus adds several benefits of having quality of service in high performance computing that are not available in the traditional method (i.e. by using MPI as a middleware). Among the benefits are that periodic publishers can indicate the speed at which they can publish by offering guaranteed update deadlines. By setting a deadline, a compliant publisher promises to send a new update at a minimum rate. Subscribers may then request data at that or any slower rate.

Another benefit is that the continuing participation or activity of entities can be monitored. The selected QoS offered with the present invention determines whether an entity or a node is "active" (i.e., alive). The application can also be informed via a listener when an entity is no longer responsive. A further benefit is that the present invention also permits the data processing System D to automatically arbitrate between multiple publishers of the same topic with a parameter called "strength." Subscribers receive from the strongest active publisher. This provides automatic failover; if a strong publisher fails, all subscribers immediately receive updates from the backup (weaker) publisher.

It is also to be noted that QoS parameters exist with the DDS employment to control the resources of the entire system, suggest latency budgets, set delivery order, attach user data, prioritize messages, set resource utilization limits and partition the system into namespaces. The present invention thus provides the ability to control QoS properties on HPC and grids that affect predictability, overhead, resource utilization, and align the computational resources to the most critical requirements.

The present invention is a feasible option for those applications in which QoS is considered a priority, or for those HPC batch jobs that would run for several days on commodity hardware, where the probability of failure is not negligible. Accordingly, the present invention provides the ability to control QoS properties on HPC and grids that affect predictability, overhead, resource utilization, and aligns the scarce resources to the most critical requirements.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of computerized processing in a data processing system of data for exploration and production of hydrocarbons, the data processing system including at least one master node established as a publisher of exploration and production data with an established quality of service standard profile including a reliability policy for the exploration and production data being processed, a plurality of processor nodes established as subscribers to receive exploration and production data from the publisher master node, and a data memory, the method comprising the computer processing steps of:
   (a) transmitting the established quality of service standard profile from the publisher master node to the subscriber processor nodes;
   (b) establishing with the publisher master node a domain for exploration and production processing by the publisher master node and designated ones of the plurality of processor nodes as subscriber processor nodes;
   (c) further establishing the designated subscriber processor nodes as data writers to transfer to the publisher master node the processed exploration and production data;
   (d) sending a source data sample of the exploration and production data from the publisher master node to the designated subscriber processor nodes of the domain;
   (e) processing the transmitted exploration and production data in the designated subscriber processor nodes of the domain;
   (f) monitoring at the publisher master node the processed exploration and production data of the designated subscriber processor nodes of the domain;
   (g) determining in the publisher master node whether the designated subscriber processor nodes of the domain comply with the transmitted established quality of service standard profile from the publisher master node; and
   (h) if so, receiving at the publisher master node the processed exploration and production data from the designated subscriber processor nodes which comply with the transmitted established quality of service standard profile; and
   (i) if not, inhibiting at the publisher master node transfer to the publisher master node of the processed exploration and production data from the designated subscriber processor nodes which do not comply with the transmitted established quality of service standard profile; and
   (j) assembling in the data memory of the data processing system the processed exploration and production data received at the publisher master node.

2. The computer implemented method of claim 1, wherein the data processing system further includes a data display, and further including the computer processing step of:
   forming an output display of the assembled processed exploration and production data.

3. The computer implemented method of claim 1, wherein the exploration and production data comprises a reservoir simulation model.

4. The computer implemented method of claim 1, wherein the exploration and production data comprises a geological model of a reservoir.

5. The computer implemented method of claim 1, wherein the exploration and production data comprises a seismic survey of the earth in a reservoir.

6. The computer implemented method of claim 1, wherein the publisher master node is further established as a data writer for transmitting a plurality of sets of the exploration and production data as domains for processing by the designated subscriber processor nodes.

7. The computer implemented method of claim 6, wherein the designated subscriber processor nodes are further established as data readers for receiving and processing selected ones of the a plurality of sets of the exploration and production data as domains transmitted by the publisher master node.

8. The computer implemented method of claim 1, wherein the publisher master node is further established as a data reader for receiving and transferring to the data memory the processed exploration and production data received from the data writers of the designated subscriber processor nodes.

9. The computer implemented method of claim 8, wherein the reliability policy of the established quality of service standard profile comprises an indication of the level of reliability of delivery required for the designated subscriber processor nodes as data writers for transfer of exploration and production data, and further including the steps of:
   (a) requesting with the data writer designated subscriber processor nodes the indication of the level of reliability according to the reliability policy; and
   (b) sending the processed exploration and production data from the data writer designated subscriber processor nodes to the publisher master node as data reader with the indicated level of reliability required according to the reliability policy.

10. A data processing system for computerized processing of data or exploration and production of hydrocarbons, the data processing system comprising a master ode, a plurality of processor nodes and a data memory, the data processing further comprising:
   (a) the master node established as a publisher of exploration and production data with an established quality of service standard profile including a reliability policy for the exploration and production data being processed, the master node performing the steps of:
- (1) transmitting the established quality of service standard profile from the publisher master node to the processor nodes;
- (2) establishing with the publisher master node a domain for exploration and production processing by the publisher master node and designated ones of the plurality of processor nodes as subscriber processor nodes;
- (3) further establishing the designated subscriber processor nodes as data writers to transfer to the publisher master node the processed exploration and production data;
- (4) sending a source data sample of the exploration and production data from the publisher master node to the designated subscriber processor nodes of the domain;

(b) the plurality of processor nodes established as subscribers to receive exploration and production data from the publisher master node, the plurality of processor nodes performing the steps of:
- (1) receiving in the designated subscriber processor nodes of the domain the exploration and production data and the established quality of service standard profile from the publisher master node;
- (2) processing the transmitted exploration and production data in the designated subscriber processor nodes of the domain; and (c) the master node further performing the steps of:
- (1) monitoring the processed exploration and production data of the designated subscriber processor nodes of the domain;
- (2) determining whether the designated subscriber processor nodes of the domain comply with the transmitted established quality of service standard profile from the publisher master node;
- (3) if so, receiving the processed exploration and production data from the designated subscriber processor nodes which comply with the transmitted established quality of service standard profile; and
- (4) if not, inhibiting at the publisher master node transfer of the processed exploration and production data from the designated subscriber processor nodes which do not comply with the transmitted established quality of service standard profile; and
- (5) assembling in the data memory the processed exploration and production data from the designated subscriber processor nodes which comply with the transmitted established quality of service standard profile.

11. The data processing system of claim 10, further including a data display, and wherein the master node further performs the step of:
forming an output display of the assembled processed exploration and production data.

12. The data processing system of claim 10, wherein the exploration and production data comprises a reservoir simulation model.

13. The data processing system of claim 10, wherein the exploration and production data comprises a geological model of a reservoir.

14. The data processing system of claim 10, wherein the exploration and production data comprises a seismic survey of the earth in a reservoir.

15. The data processing system of claim 10, wherein the publisher master node is further established as a data writer for transmitting different sets of the exploration and production data as domains for processing by the designated subscriber processor nodes.

16. The data processing system of claim 15, wherein the designated subscriber processor nodes are further established as data readers for receiving and processing selected ones of the different sets of the exploration and production data as domains transmitted by the publisher master node.

17. The data processing system of claim 10, wherein the publisher master node is further established as a data reader for receiving and transferring to the data memory the processed exploration and production data received from the data writers of the designated subscriber processor nodes.

18. The data processing system of claim 17, wherein the reliability policy of the established quality of service standard profile comprises an indication of the level of reliability of delivery required for the designated subscriber processor nodes as data writers for transfer of exploration and production data, and further including the steps of:
- (a) requesting the indication of the level of reliability according to the reliability policy; and
- (b) sending the processed exploration and production data to the publisher master node as data reader with the indicated level of reliability required according to the reliability policy.

19. A data storage device having stored in a non-transitory computer readable storage medium computer operable instructions for causing a data processing system to perform computerized processing of data for exploration and production of hydrocarbons, the data processing system including at least one master node established as a publisher of exploration and production data with an established quality of service standard profile including a reliability policy for the exploration and production data being processed, a plurality of processor nodes established as subscribers to receive the exploration and production data from the publisher master node, and a data memory, the instructions stored in the data storage device causing the data processing system to perform the following steps:
- (a) transmitting the established quality of service standard profile from the publisher master node to the subscriber processor nodes;
- (b) establishing with the publisher master node a domain for exploration and production processing by the publisher master node and designated ones of the plurality of processor nodes as subscriber processor nodes;
- (c) further establishing the designated subscriber processor nodes as data writers to transfer to the publisher master node the processed exploration and production data;
- (d) sending a source data sample of the exploration and production data from the publisher master node to the designated subscriber processor nodes of the domain;
- (e) processing the transmitted exploration and production data in the designated subscriber processor nodes of the domain;
- (f) monitoring at the publisher master node the processed exploration and production data of the designated subscriber processor nodes of the domain;
- (g) determining in the publisher master node whether the designated subscriber processor nodes of the domain comply with the transmitted established quality of service standard profile from the publisher master node; and
- (h) if so, receiving at the publisher master node the processed exploration and production data from the designated subscriber processor nodes which comply with the transmitted established quality of service standard profile; and (i) if not, inhibiting at the publisher master node transfer to the publisher master node of the processed exploration and production data from the designated subscriber processor nodes which do not comply with the transmitted established quality of service standard profile; and (j) assembling in the data memory of the computer system the processed exploration and production data received at the publisher master node.

20. The data storage device of claim 19, wherein the data processing system further includes a data display, and wherein the instructions further include instructions causing the data processing system to perform the step of:

forming an output display of the assembled processed exploration and production data.

21. The data storage device of claim 19, wherein the exploration and production data comprises a reservoir simulation model.

22. The data storage device of claim 19, wherein the exploration and production data comprises a geological model of a reservoir.

23. The data storage device of claim 19, wherein the exploration and production data comprises a seismic survey of the earth in a reservoir.

24. The data storage device of claim 19, wherein the publisher master node is further established as a data writer and wherein the instructions further include instructions causing the publisher master node to perform the step of transmitting different sets of the exploration and production data as domains for processing by the designated subscriber processor nodes.

25. The data storage device of claim 24, wherein the designated subscriber processor nodes are further established as data readers and wherein the instructions further include instructions causing the designated subscriber processor nodes to perform the step of receiving and processing selected ones of the different sets of the exploration and production data as domains transmitted by the publisher master node.

26. The data storage device of claim 19, wherein the publisher master node is further established as a data reader and wherein the instructions further include instructions causing the publisher master node as data reader to perform the step of receiving and transferring to the data memory the processed exploration and production data received from the data writers of the designated subscriber processor nodes.

27. The data storage device of claim 26, wherein the reliability policy of the established quality of service standard profile comprises an indication of the level of reliability of delivery required for the designated subscriber processor nodes as data writers for transfer of exploration and production data, and further including the steps of:

(a) requesting with the data writer designated subscriber processor nodes the indication of the level of reliability; and (b) sending the processed exploration and production data from the data writer designated subscriber processor nodes to the publisher master node as data reader with the indicated level of reliability.

\* \* \* \* \*

UNITED STATES PATENT AND TRADEMARK OFFICE
CERTIFICATE OF CORRECTION

Page 1 of 1

PATENT NO.         : 9,128,211 B2
APPLICATION NO.    : 14/490894
DATED              : September 8, 2015
INVENTOR(S)        : Raed Abdullah AlShaikh et al.

It is certified that error appears in the above-identified patent and that said Letters Patent is hereby corrected as shown below:

IN THE CLAIMS
In Column 12, Line 63, Claim 10, the third to the last word appears as "ode," and should read --node,--.

Signed and Sealed this
Nineteenth Day of January, 2016

Michelle K. Lee
*Director of the United States Patent and Trademark Office*